3,389,036
METHOD OF MAKING POLYETHYLENE LAMINATES

Arthur Rudolph, Evergreen Park, and John Thomas McShane, Chicago, Ill., assignors to Interchemical Corporation, New York, N.Y., a corporation of Ohio
Filed June 16, 1964, Ser. No. 375,660
3 Claims. (Cl. 156—244)

ABSTRACT OF THE DISCLOSURE

A method for preparing a polyethylene laminate which consists in extruding molten polyethylene onto a web substrate and immediately applying an adhesive topcoat to the polyethylene film. The improvement resides in the adhesive topcoat composition which comprises an organic solvent solution of shellac and nitrocellulose.

---

This invention relates to a method of making polyolefin laminates. More particularly it relates to a method of making polyolefin and especially polyethylene laminates having a web substrate, an intermediate polyethylene layer and top coating which displays remarkable adhesion to printing inks and other coatings and sheets.

One of the major problems in using polyethylene films and coatings has been their lack of adhesion to other materials which may be coated onto the polyethylene. U.S. Patent 2,955,970, Rice et al., describes a method of overcoming this lack of adhesion of polyethylene to overcoatings in such laminates. This is accomplished by (1) filming an aqueous, hydrophilic solution of a material such as starch, carboxymethyl cellulose, protein (e.g., gelatin, casein), polyvinyl alcohol or polyvinyl acetate on a surface (2) heating the filmed solution to evaporate water (3) simultaneously extrusion-coating a web backing with a polyolefin and applying said heated and dried topcoat to the exposed side of the polyolefin film.

While the films overcoated on to the polyethylene display excellent adhesion to the polyethylene, they display only adequate adhesion, particularly in the presence of moisture, to inks used in printing on the coated polyethylene. The inks printed on the films have very poor "wet rub resistance" and tend to separate from the films when subjected to friction or rubbing under moist conditions. This lack of adhesion under wet conditions is a very significant shortcoming since the laminates described above are used extensively in the packaging field, particularly in food packaging where the package may be expected to be subjected to moist conditions, e.g., when the package is refrigerated.

We have now discovered that a laminate having a web substrate, an intermediate polyethylene layer and a top coat which has excellent adhesion both to the polyethylene intermediate layer and to printing inks, particularly conventional letterpress and offset inks such as oleoresinous or alkyd based inks may be produced by following the method set forth in U.S. Patent 2,955,970 with the improvement that in place of the aqueous and hydrophilic coating solutions of said patent, there are used non-hydrophilic solutions of shellac and nitrocellulose in organic solvents. In addition to the excellent adhesion to overprinting inks, including excellent "wet rub resistance," coatings of this invention display the same high gloss, improved slip resistance and good resistance to static charge buildup as do the coatings of said patent.

We consider our discovery to be quite unexpected in view of the patent's teaching that the coatings must be hydrophilic and preferably aqueous.

Preferably, our coatings comprise from 2 to 4 parts of shellac for each part of nitrocellulose.

The organic solvents which we use are conventional for blends of shellac and nitrocellulose. While ethanol may be the sole solvent, it is preferable to use a cosolvent such as ethyl acetate, isopropyl acetate and preferably n-propyl acetate. Preferably the cosolvent constitutes from 10% to 20% of the total solvent weight. While ethanol is the preferred alcohol, other alcohols such as isopropanol and n-propanol may be substituted for it.

When applying the solution of shellac and nitrocellulose, the solids content is preferably from 20 to 30%. The wet applied coating weight may be varied from 0.10 lb. per 1000 sq. ft. to 3.0 lbs. per 1000 sq. ft. depending on the results desired.

The coating may also be brushed or buffed in accordance with the procedure set forth in U.S. Patent No. 2,955,970.

In the present specification and claims, all proportions are by weight unless otherwise specified.

The following example will further illustrate the present invention:

EXAMPLE

Figure 1:
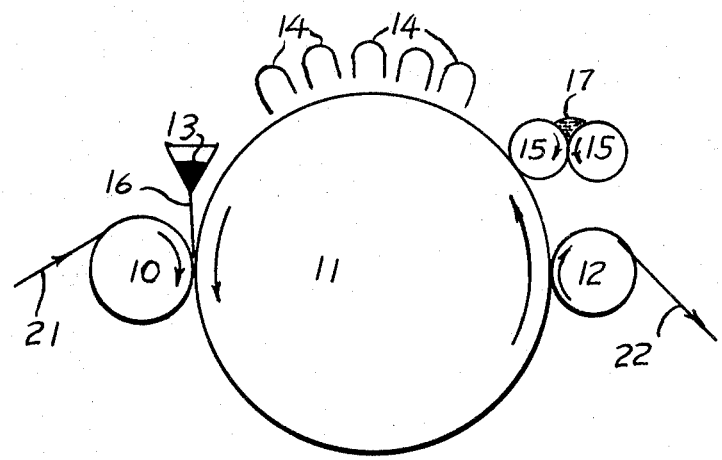
FIGURE 1 is a schematic sectional fragmentary view showing the apparatus involved in the coating operation of this invention.

In FIGURE 1, a web of kraft paper 21 is drawn from a reel (not shown) and is fed over a rubber faced roller 10 to a nip formed between the roller and cooling drum 11. The polyethylene is extruded through die 13 and is coated to the paper at the nip formed by drum 11 and rubber roller 10 by any standard extrusion-coating process common in the art. A coating solution 17, consisting of 288 parts of shellac and 100 parts of nitrocellulose SS dissolved in 552 parts of ethanol and 60 parts of n-propyl acetate is fed by means of rubber rollers 15 to the upper portion of the internally cooled drum 11. This coating passes underneath heaters 14 so that the solvent is evaporated from it. The exposure time required is about one second at a paper speed of 200 feet per minute. The coating is transferred directly to the hot extruded polyethylene film 16 as it is being combined with the paper in the nip formed between the drum 11 and the rubber roller 10. Paper, with the polyethylene film and the coating thereto attached 22 is then removed by a suitable take-up roller.

Figure 2:
FIGURE 2 is a partial cross-sectional diagram of the laminate structure.

The details of the coated paper are shown in FIG. 2. Thus the paper web 20 is shown coated with an intermediate coating of polyethylene 19 which in turn is overcoated with a layer of topcoating composition 18.

While there have been described what is at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. In the method of affixing adhesives to a freshly heated polyethylene surface which comprises feeding a paper web into a nip formed by a cooling drum and a rubber faced backing pressure roller, leading to the same nip between the cooling drum and the paper web, a sheet of molten polyethylene material to form a polyethylene film and immediately applying an adhesive to the polyethylene film so formed, the improvement wherein the adhesive is a composition comprising a solution of shellac and nitrocellulose in a solvent comprising ethanol and n-propyl acetate.

2. In the method of treating a heated polyethylene surface comprising feeding a paper into a nip formed by a cooling drum and a rubber faced backing pressure roller, leading to the same nip between the cooling drum and the paper, a sheet of molten polyethylene material and immediately depositing on the cooling drum an adhesive in such a manner as to be carried into the same nip between the polyethylene film and the cooling drum so as to be directly applied to the polyethylene film, the improvement wherein the adhesive is a composition comprising a solution of shellac and nitrocellulose in a solvent comprising ethanol and n-propyl acetate.

3. The method of claim 2 wherein the adhesive deposited on the drum is subjected to radiant heat before it is affixed to the polyethylene film.

References Cited

UNITED STATES PATENTS

| 2,652,351 | 9/1953 | Gerhardt | 161—246 X |
| 2,668,134 | 2/1954 | Horton | 156—316 |
| 2,955,970 | 10/1960 | Rice et al. | 156—244 |
| 2,991,184 | 7/1961 | Bernadi et al. | 106—30 |
| 3,318,721 | 5/1967 | Lineburg | 117—138.8 X |

EARL M. BERGERT, *Primary Examiner.*

T. R. SAVOIE, *Assistant Examiner.*